(12) United States Patent
Wang

(10) Patent No.: US 10,306,320 B2
(45) Date of Patent: May 28, 2019

(54) PROVIDING SERVICE BASED ON USER OPERATION BEHAVIOR

(71) Applicant: Alibaba Group Holding Limited, Grand Cayman (KY)

(72) Inventor: Wanxing Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/074,733

(22) Filed: Mar. 18, 2016

(65) Prior Publication Data

US 2016/0277800 A1 Sep. 22, 2016

(30) Foreign Application Priority Data

Mar. 19, 2015 (CN) .......................... 2015 1 0122598

(51) Int. Cl.
*H04N 21/472* (2011.01)
*H04N 21/45* (2011.01)
(Continued)

(52) U.S. Cl.
CPC ....... *H04N 21/472* (2013.01); *H04N 21/4532* (2013.01); *H04N 21/466* (2013.01);
(Continued)

(58) Field of Classification Search
CPC ............. H04N 21/472; H04N 21/4532; H04N 21/466; H04N 21/4667; H04N 21/478;
(Continued)

(56) References Cited

U.S. PATENT DOCUMENTS 9,148,698 B1 * 9/2015 Jaini .................. H04N 21/4751
2002/0147645 A1 10/2002 Alao et al.
(Continued)

FOREIGN PATENT DOCUMENTS

CN 101079062 A 11/2007
CN 102479366 A 5/2012
(Continued)

OTHER PUBLICATIONS

PCT Search Report and Written Opinion dated Jun. 7, 2016 for PCT Application No. PCT/US16/23195, 13 pages.
(Continued)

*Primary Examiner* — Randy A Flynn
(74) *Attorney, Agent, or Firm* — Lee & Hayes, P.C.

(57) ABSTRACT

A service providing method based on user operation behavior including determining whether a current service interface provides a valid service according to received operation information; and when the valid service is not provided, performing the following operation: providing a preset service for a user when a preset service trigger condition is met. The present disclosure also provides a service providing apparatus based on user operation behavior. By use of the method provided in the present disclosure, the techniques of the present disclosure relatively accurately identify whether the user is in a browsing state without a determined target, and timely provide a preset service for the user, thereby increasing user loyalty of a user service system and improving use experience of the user.

19 Claims, 7 Drawing Sheets

(51) Int. Cl.
  *H04N 21/466* (2011.01)
  *H04N 21/478* (2011.01)
  *H04N 21/482* (2011.01)
  *H04N 5/44* (2011.01)
  *H04N 5/445* (2011.01)

(52) U.S. Cl.
  CPC ....... *H04N 21/4667* (2013.01); *H04N 21/478* (2013.01); *H04N 21/4826* (2013.01); *H04N 5/4403* (2013.01); *H04N 5/445* (2013.01)

(58) Field of Classification Search
  CPC ... H04N 21/4826; H04N 5/4403; H04N 5/445
  See application file for complete search history.

(56) References Cited

U.S. PATENT DOCUMENTS

| | | |
|---|---|---|
| 2003/0063129 A1 | 4/2003 | Smyth et al. |
| 2004/0003402 A1 | 1/2004 | McKenna, Jr. |
| 2005/0105467 A1 | 5/2005 | True et al. |
| 2007/0198987 A1 | 8/2007 | Bottger et al. |
| 2008/0134237 A1* | 6/2008 | Tu .................. H04N 21/475 725/38 |
| 2010/0071000 A1* | 3/2010 | Amento .......... H04N 21/44204 725/39 |
| 2010/0153997 A1* | 6/2010 | Baumgartner ..... H04N 21/4622 725/39 |
| 2011/0022476 A1 | 1/2011 | Barkley et al. |
| 2011/0093578 A1 | 4/2011 | Leng |
| 2011/0125509 A1 | 5/2011 | Lidstrom et al. |
| 2011/0209174 A1 | 8/2011 | Kikinis et al. |
| 2011/0289460 A1* | 11/2011 | Dow .................. H04N 21/4312 715/854 |
| 2013/0144822 A1 | 6/2013 | Zhang et al. |
| 2014/0075460 A1 | 3/2014 | Jin et al. |
| 2014/0223573 A1 | 8/2014 | Reedy et al. |
| 2014/0379617 A1 | 12/2014 | Yang et al. |
| 2015/0029089 A1 | 1/2015 | Kim |
| 2015/0137937 A1* | 5/2015 | Smith ................ H04N 21/4415 340/5.52 |

FOREIGN PATENT DOCUMENTS

| | | |
|---|---|---|
| CN | 103581752 A | 2/2014 |
| CN | 103713989 A | 4/2014 |
| JP | 2002094561 A | 3/2002 |

OTHER PUBLICATIONS

Chinese Search Report for Application No. 2015101225986, dated Jun. 8, 2018, 2 pages.

* cited by examiner

PROVIDING SERVICE BASED ON USER OPERATION BEHAVIOR

CROSS REFERENCE TO RELATED APPLICATION

The present disclosure claims the benefit of Chinese Patent Application Number 201510122598.6 filed Mar. 19, 2015, entitled "METHOD AND APPARATUS FOR PROVIDING SERVICE BASED ON USER OPERATION" which is hereby incorporated by reference in its entirety.

TECHNICAL FIELD

The present disclosure relates to the field of computer services, and in particular, to a service providing method based on user operation behavior. The present disclosure also relates to a service providing apparatus based on user operation behavior.

BACKGROUND

With the development of science and technology as well as Internet technology, an increasing number of systems that provide services for users (referred to as user service systems) have emerged, which provide rich and colorful services for the users in various fields. A smart TV system is a product formed under the Internet wave impact, with the purpose of bringing in more convenient experience to the users, which has become a TV trend at present.

With the development of smart TVs, TV sets no longer only have a simple function of watching fixed TV programs, but own more and more functions and content with user experiences, such as, film and video, applications, games and so on, and in order to increase user loyalty of the smart TVs, the TV sets generally also have some additional service functions, such as a service content recommendation function. At present, there are three main manners of recommendation adopted:

1) recommending fixed content to a user in a unified way;
2) speculating the user' mood by detecting physical signs (heart rate, body temperature and so on) of the user and performing simple calculation or matching, or determining the current mood and state of the user through facial recognition and voice recognition, and implementing recommendation on the basis of the above; and
3) collecting and extracting lots of historical operation data of the user and pre-establishing a user operation model, extracting operation features, and performing matching according to the model when the user performs an actual operation.

In actual applications, the above three manners all have their own defects, which are described respectively in the following.

1) This manner belongs to a static recommendation manner, which, due to not using the user's behavior and state into account, does not have a high recommendation conversion rate and cannot provide a service that makes the user satisfied.

2) This manner is greatly affected by the physique of the user or the environment where the TV set is located and a distance between the user and the TV set, resulting in that the user state is not determined accurately, and recommendation implemented on this basis is naturally difficult to make the user satisfied; in addition, hardware such as a sensor camera is also required, which increases the cost of the whole service system.

3) Since one TV set often has many users (shared by multiple family members), and the pre-established model is not specific to a certain particular user, matching a real-time operation state of a certain user with the model and accordingly implementing recommendation generally cannot bring good use experience to the user.

SUMMARY

This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a service providing method based on user operation behavior, to solve the problem in the conventional techniques that are unable to provide a valid service for the user in time as the user state is not accurately determined. The present disclosure also provides a service providing apparatus based on user operation behavior.

The present disclosure provides an example service providing method based on user operation behavior, including:
determining whether a current service interface provides a valid service according to received operation information; and
when the valid service is not provided, performing the following operation:
providing a preset service for a user when a preset service trigger condition is met.

Optionally, the preset service trigger condition includes:
the number of times the valid service is not provided being greater than a preset threshold;
wherein the number of times the valid service is not provided includes:
the number of times the current service interface does not provide the valid service; or
the number of times the current service interface does not provide the valid service and the number of times other lower-level interfaces of the current service interface's upper-level interface do not provide the valid service.

Optionally, when the number of times the valid service is not provided includes the number of times the current service interface does not provide the valid service and the number of times the other lower-level interfaces of the current service interface's upper-level interface do not provide the valid service, the current service interface is used as a leaf node, and whether the preset service trigger condition is met is determined as follows:
setting a trigger parameter value of the leaf node; and
using a parent node of the leaf node as a current node, and performing the following operations for the current node:
calculating a trigger parameter value of the current node according to trigger parameter values of respective child nodes of the current node; and
if the trigger parameter value of the current node is greater than a preset first threshold, determining that the preset service trigger condition is met;
wherein the trigger parameter value is set according to the number of times that the corresponding node does not provide the valid service, the parent node of the leaf node corresponds to the upper-level interface of the service interface, and the respective child nodes of the current node correspond to the other lower-level interfaces of the upper-level interface.

Optionally, the calculating a trigger parameter value of the current node according to trigger parameter values of respective child nodes of the current node includes:

summing the trigger parameter values of the respective child nodes; and multiplying a result of the summing by a weight coefficient set for the current node, and using the product as the trigger parameter value of the current node.

Optionally, if the trigger parameter value of the current node is not greater than the preset first threshold, a parent node of the current node is used as a next current node, and the above described operations for the current node are performed.

Optionally, a first threshold preset for a root node is an integer less than the minimum possible value of the trigger parameter; and a first threshold preset for other non-leaf nodes is an integer greater than the maximum possible value of the trigger parameter.

When the trigger parameter value of the current node is not greater than the preset first threshold, the following operations are performed:

determining whether the trigger parameter value of the current node is greater than a preset second threshold; and if a result is positive, using the parent node of the current node as a current node, and the above described operation for the current node are performed.

Optionally, when the service interface provides the valid service, the following operation is performed:

setting trigger parameter values of respective nodes corresponding to respective interfaces associated with a service type of the current service interface as preset initial values.

Optionally, the service interface provides the valid service, which includes:

the length of time when the service interface provides the service being greater than a preset valid threshold; and/or receiving or performing, by the service interface, a preset operation.

Optionally, the operation of providing a preset service for a user includes recommending preset service content to the user.

Optionally, the operation of recommending preset service content to the user includes:

according to a service type of the current service interface, recommending service content that is preset and corresponds to the service type to the user.

Optionally, when the current service interface does not provide the valid service, before whether a preset service trigger condition is met is determined, the following operation is performed:

recording invalid service content provided by the current service interface.

The operation of recommending preset service content to the user includes:

eliminating the invalid service content provided by the current service interface from the preset service content; and recommending the service content, from which the eliminating operation has been performed, to the user.

Optionally, the method is implemented as follows:

using a behavior tree to record related information of the service interface providing a service for the user, and managing respective nodes and a relationship between the respective nodes; wherein a leaf node corresponds to an execution node in the behavior tree, an intermediate node corresponds to a sequence node in the behavior tree, and a root node corresponds to a selection node or a sequence node in the behavior tree.

Optionally, the method is completed by a service terminal and a client terminal that presents a service interface for the user through cooperation.

For example, the operation information is received by the client terminal. The service terminal determines whether a valid service is provided and whether a preset service trigger condition is met. The service terminal pushes the preset service to the client terminal; and the client terminal provides the preset service to the user.

Optionally, the method is implemented in a smart TV system.

The service interface includes: a video play interface, a game interface, and/or a shopping ordering interface.

Correspondingly, the present disclosure further provides a service providing apparatus based on user operation behavior, including:

a valid service determination unit that determines whether a current service interface provides a valid service according to received operation information; and a preset service providing unit that, when an output of the valid service determination unit is negative, provides a preset service to a user when a preset service trigger condition is met.

Optionally, the preset service providing unit includes:

a trigger condition determination sub-unit that determines whether the preset service trigger condition is met; and a service providing execution sub-unit that, when output of the trigger condition determination sub-unit is positive, provides the preset service for the user, The preset service trigger condition used by the trigger condition determination sub-unit includes:

the number of times the valid service is not provided being greater than a preset threshold.

The number of times the valid service is not provided includes:

the number of times the current service interface does not provide the valid service; or the number of times the current service interface does not provide the valid service and the number of times other lower-level interfaces of the current service interface's upper-level interface do not provide the valid service.

Optionally, when the preset service trigger condition used by the trigger condition determination sub-unit is the number of times the current service interface does not provide the valid service and the number of times the other lower-level interfaces of the current service interface's upper-level interface do not provide the valid service are greater than the preset threshold, the trigger condition determination sub-unit includes:

a trigger parameter setting sub-unit that sets a trigger parameter value corresponding to a leaf node of the current service interface, and uses a parent node of the leaf node as a current node;

a trigger parameter calculation sub-unit that calculates a trigger parameter value of the current node according to trigger parameter values of respective child nodes of the current node; and a first threshold determination sub-unit that determines whether the trigger parameter value of the current node is greater than a preset first threshold, wherein a determination result of the sub-unit is the output of the trigger condition determination sub-unit.

Optionally, the trigger parameter calculation sub-unit includes:

a child node accumulation sub-unit that sums the trigger parameter values of the respective child nodes; and a weight coefficient multiplication sub-unit that multiples a result of the sum by a weight coefficient set for the current node, and uses the product as the trigger parameter value of the current node.

Optionally, the trigger condition determination sub-unit further includes:

a first jump control sub-unit that, when output of the first threshold determination sub-unit is negative, uses a parent node of the current node as a current node, and triggers the trigger parameter calculation sub-unit to work.

Optionally, the preset first threshold used by the first threshold determination sub-unit is set as follows: a first threshold of the root node is an integer less than the minimum possible value of the trigger parameter; and a first threshold of other non-leaf nodes is an integer greater than the maximum possible value of the trigger parameter.

The trigger condition determination sub-unit further includes:

a second threshold determination sub-unit that, when the output of the first threshold determination sub-unit is negative, determines whether the trigger parameter value of the current node is greater than a preset second threshold; and a second jump control sub-unit that, when output of the second threshold determination sub-unit is positive, uses a parent node of the current node as a current node, and triggers the trigger parameter calculation sub-unit to work.

Optionally, the apparatus further includes:

a trigger parameter value clearing unit that, when the output of the valid service determination unit is positive, sets trigger parameter values of respective nodes corresponding to respective interfaces associated with a service type of the current service interface as preset initial values.

Optionally, the valid service determination unit determines whether the service interface provides the valid service by using the following methods:

whether the time when the service interface provides the service is greater than a preset valid threshold; and/or whether the service interface receives or performs a preset operation.

Optionally, the preset service providing unit recommends preset service content to the user.

Optionally, the preset service providing unit, according to a service type of the current service interface, recommends service content that is preset and corresponds to the service type to the user.

Optionally, the apparatus further includes:

an invalid service recording unit that, when the output of the valid service determination unit is negative, records invalid service content provided by the current service interface; and the preset service providing unit includes:

an invalid content elimination sub-unit that eliminates the invalid service content provided by the current service interface from the preset service content; and a service content recommendation sub-unit that recommends the service content, from which the eliminating operation has been performed, to the user.

Optionally, the apparatus may implement the following operations: using a behavior tree to record related information about the service interface providing a service for the user, and managing respective nodes and a relationship between the respective nodes, wherein a leaf node corresponds to an execution node in the behavior tree, an intermediate node corresponds to a sequence node in the behavior tree, and a root node corresponds to a selection node or a sequence node in the behavior tree.

Optionally, the apparatus is deployed at a service terminal and a client terminal that presents a service interface for the user.

The client terminal receives operation information of the user. The valid service determination unit and the preset service providing unit are deployed at the service terminal, and the client terminal further provides the preset service pushed by the preset service providing unit at the service terminal for the user.

Optionally, the apparatus is deployed in a smart TV system; and the service interface used by the valid service determination unit includes: a video play interface, a game interface, and/or a shopping ordering interface.

Compared with the conventional techniques, the present disclosure has the following advantages:

According to a service providing method based on user operation behavior of the present disclosure, whether a current service interface provides a valid service is determined according to received operation information; and when the valid service is not provided and a preset service trigger condition is met, a preset service is provided for a user. By use of the method, the techniques of the present disclosure relatively accurately identify whether the user is in a browsing state that cannot determine target, and timely provide a preset service for the user, thereby increasing user loyalty of a user service system and improving use experience of the user. In particular, the method may be applied to a smart TV system, which effectively enhances the recommendation conversion rate as a relatively accurate recommendation moment is selected according to the user state.

DETAILED DESCRIPTION

Lots of specific details are described in the following description to make it convenient to fully understand the present disclosure. However, the present disclosure may be implemented in many other manners different from those described herein, and persons skilled in the art may make similar improvements without violating the principles of the present disclosure, and thus the present disclosure is not limited by specific implementation disclosed below.

In example embodiments of the present disclosure, a service providing method based on user operation behavior and a service providing apparatus based on user operation behavior are provided respectively, and are described in detail one by one in the following example embodiments.

An application or a system that provides a user with services (hereinafter collectively referred to as a user service system) generally includes multiple service interfaces and upper-level interfaces that switching among the multiple service interfaces, and these upper-level interfaces are also referred to as browsing interfaces. The service interfaces provide the user with specific services, the browsing interfaces include entries of all levels of interfaces therebelow (referred to as lower-level interfaces), and the user may enter into the lower-level interfaces by clicking corresponding interfaces on the browsing interfaces, so as to achieve switching among different service interfaces and acquire desired services.

By using a smart TV system as an example, generally, functions are classified by using a main interface as an entry, the main interface is a first-level interface, a certain entry option in the main interface is clicked to enter into a second-level interface, and the rest may be deduced by analogy. For example, the main interface has main entries such as film and video, TV play, shopping, game and application (different entries correspond to different service types). After the entries are entered, there are subdivided second-level interfaces under respective categories. For example, the film and video is divided into Chinese, Europe and America, Japan and South Korea and other categories. After different categories are selected, respective corresponding third-level interfaces are entered. For example, the category of Chinese is Popular Chinese Movies, and a play interface is entered after each movie is clicked. At the same time, the upper-level interface is returned by pressing a return operation on each interface.

Figure 1:
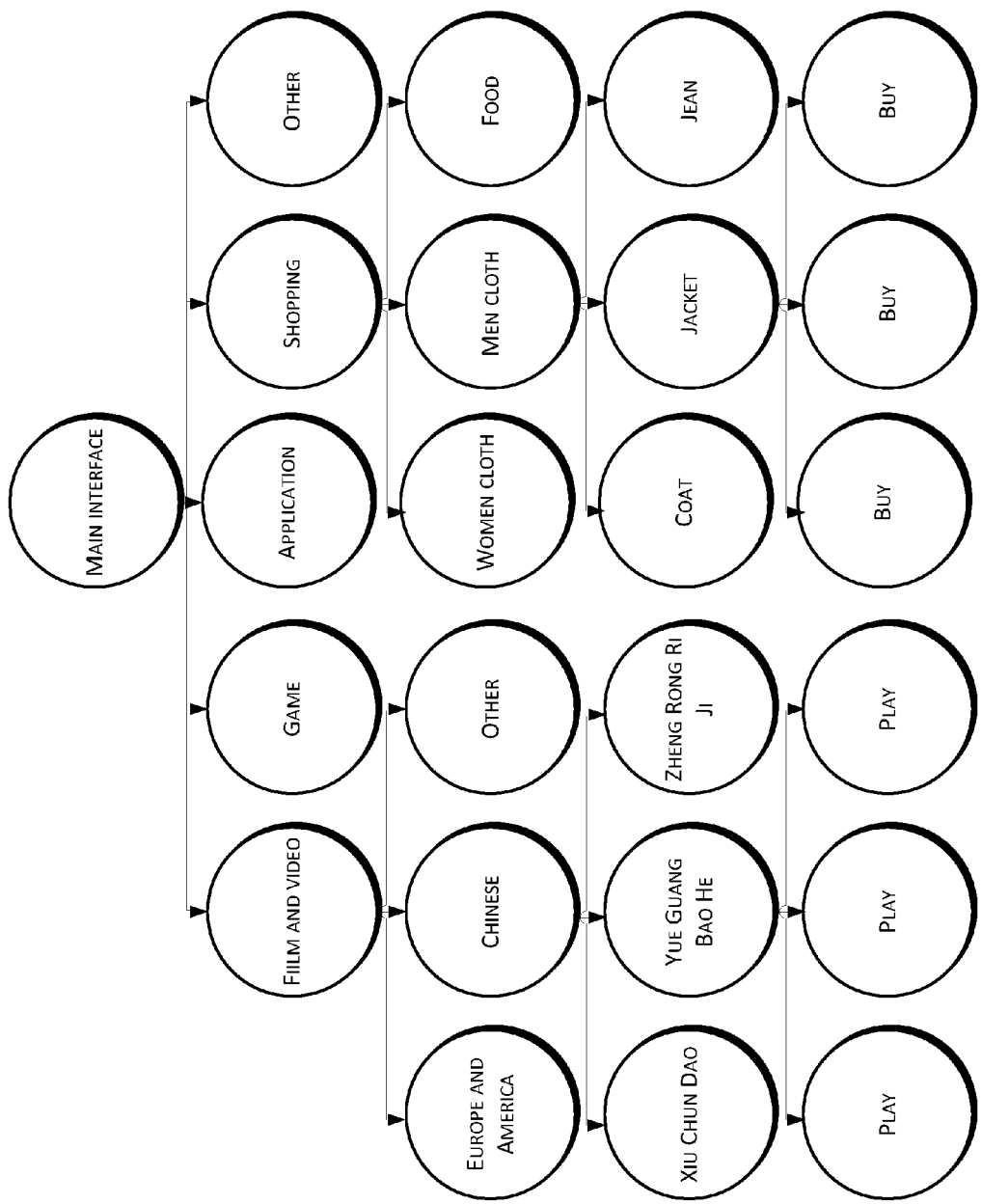
FIG. 1 is a schematic diagram of an example organizational form of a smart TV operation interface.

Referring to FIG. 1, which is a schematic diagram of an example organizational form of a smart TV operation interface, wherein the main interface and all levels of interfaces such as second-level and third-level interfaces are the browsing interfaces described previously, and the play interface, the purchase interface and the like are service interfaces that provide specific services.

According to the service providing method based on user operation behavior provided in the present disclosure, in the event that a current service interface does not provide a valid service, if a preset service trigger condition is met, it generally indicates that the user is in a state with an undetermined browsing target and non-acquisition of the valid service has reached a certain degree, at this point, it is feasible to enhance user loyalty of the user service system by providing a preset service for the user.

Figure 2:
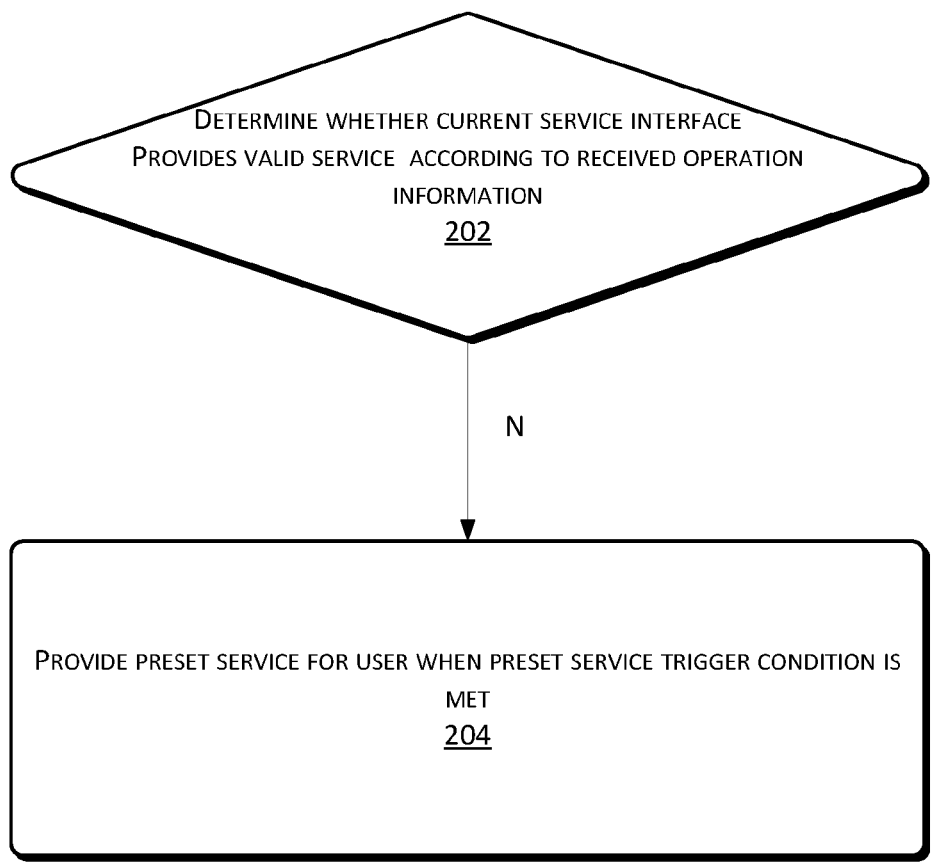
FIG. 2 is a flowchart of an example service providing method based on user operation behavior according to the present disclosure.

Referring to FIG. 2, which is a flowchart of an example service providing method based on user operation behavior according to the present disclosure. The method includes the following operations:

At 202, whether a current service interface provides a valid service is determined according to received operation information; if the valid service is not provided, operations at 204 are performed.

Reference of this operation may be made to the description in the following specific example embodiments.

At 204, a preset service is provided for a user when a preset service trigger condition is met.

The preset service trigger condition includes: the number of times the valid service is not provided being greater than a preset threshold. The number of times the valid service is not provided may be the number of times the current service interface does not provide the valid service. In an implementation, when the user does not acquire a valid service from a certain service interface, the number of times of the invalid service previously recorded for the service interface is read and continued to accumulate on the basis of the value. If the number of times of the invalid service obtained through the accumulation this current time is over the preset threshold, a preset service is provided for the user; otherwise, the number of times of the invalid service obtained through the calculation this current time is recorded for the service interface, and if the service interface subsequently provides the invalid service once again, the value continues to accumulate.

In consideration of that, in a specific application, the user may switch among multiple service interfaces and upper-level browsing interfaces thereof, and in order to provide the preset service for the user more timely, the present techniques accumulate the number of times that a valid operation is not provided within a wider range. That is, the number of times that the valid service is not provided may include: the number of times the current service interface does not provide the valid service and the number of times other lower-level interfaces of the current service interface's upper-level interface do not provide the valid service. In a specific implementation, the current service interface's upper-level interface is used as a starting point to accumulate level by level from the bottom up, each level of interface is conducted calculation according to the number of times that various service interfaces included therebelow do not provide the valid service, and when an accumulation result is greater than the preset threshold, the preset service is provided for the user.

The preset service trigger condition may further include: the time when the valid service is not provided being greater than the preset threshold. That is to say, if the valid service is not provided within a period of time before the current time (that is, a time point at which the current interface does not provide the valid service is determined) and the length of the period of time is greater than the preset threshold, the preset service is provided for the user, which also achieves the technical solution of the present disclosure and corresponding beneficial effects.

The above briefly describes the technical solution, and focuses on describing the preset service trigger condition. In order to conveniently understand implementation methods of the technical solution, two specific example embodiments are provided in the following for an implementation mode of accumulating level by level from the bottom up and determining whether a service trigger condition is met.

For the convenience of description, a tree-like structure is used in the two example embodiments to describe the user service system, wherein the top browsing interface corresponds to a root node of the tree-like structure, other levels of browsing interfaces correspond to intermediate nodes of the tree-like structure respectively, and the service interfaces located in the deepest place of the tree-like structure correspond to leaf nodes respectively.

Figure 3:
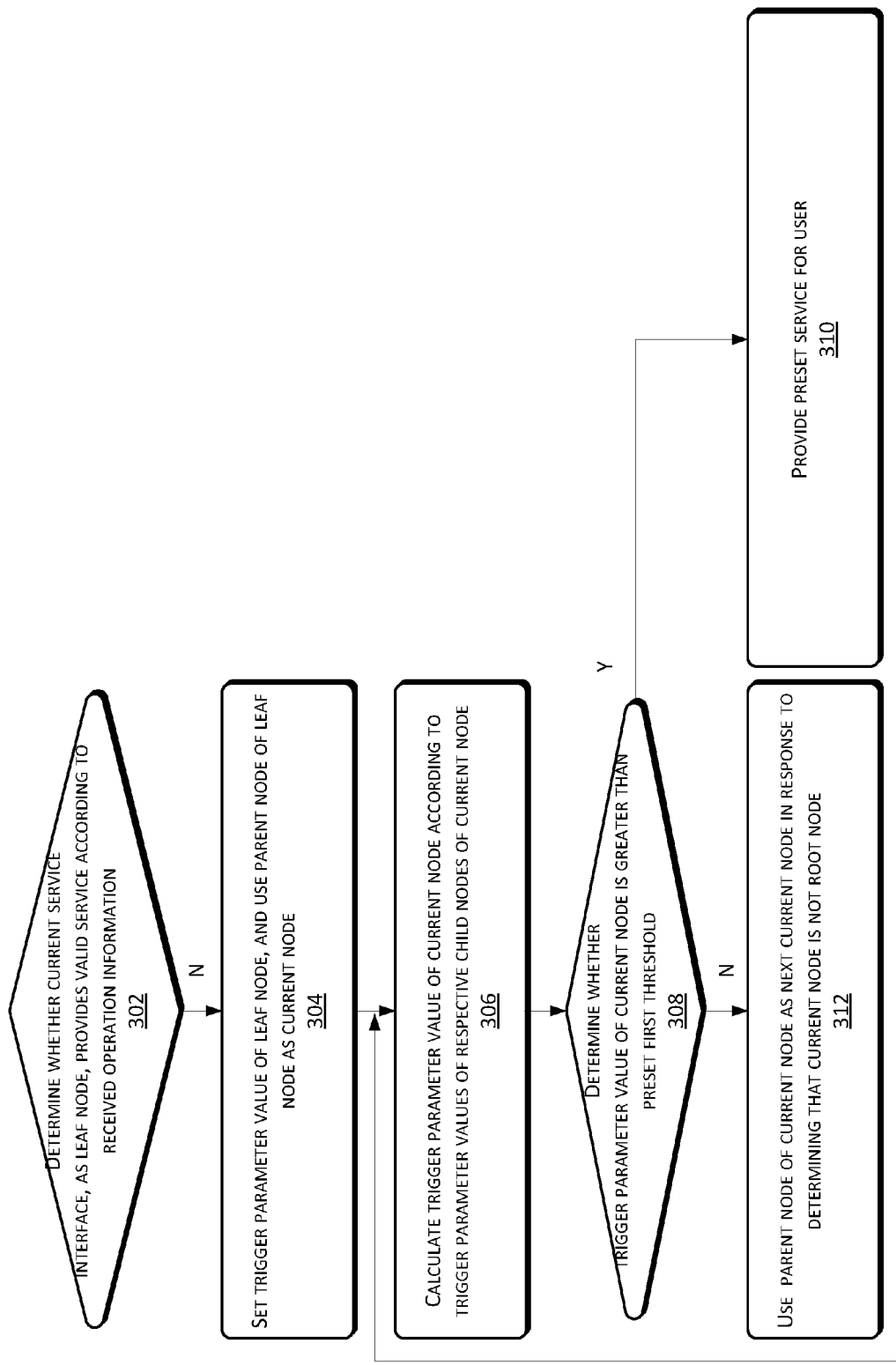
FIG. 3 is a flowchart of a first example embodiment of a service providing method based on user operation behavior according to the present disclosure.

Referring to FIG. 3, which is a flowchart of a first example embodiment of a service providing method based on user operation behavior according to the present disclosure. In this example embodiment, whether a preset service is provided for a user is determined according to a first threshold set for each browsing interface. The method includes the following operations:

At 302, whether a current service interface, as a leaf node, provides a valid service is determined according to received operation information, and if a result is negative, operations at 304 are performed.

In applications, the user may switch among various interfaces presented by the user service system through peripherals such as a remote controller, a mouse and a keyboard, and enter into a certain service interface that serves as a leaf node, and with respect to a system that presents various interfaces through a touch screen, the above operations may be implemented through touching the screen.

The user service system may receive and record the above operation information of the user and determine according to the operation information whether the user executes a valid operation in the service interface, that is, whether the service interface provides a valid service for the user during a one-time entry and exit operation of the service interface.

To determine that the service interface provides the valid service may be based on that the time when the service interface provides the service is greater than a preset valid threshold; that the service interface receives or performs a preset operation; or the service interface meets both of the above two conditions. In a specific implementation, a determination method about the valid service may be voluntarily set according to a service type provided by the user service system.

For example, in a smart TV system, with respect to a video play interface, it is considered that a valid service is provided if the play time is greater than or equal to 10 minutes and an invalid service is provided if the play time is less than 10 minutes; with respect to a shopping interface, it is considered that a valid service is provided if an ordering operation of the user is received; otherwise, the valid service is not provided.

As an example implementation mode, if it is determined in this operation that the current service interface does not provide the valid service, the invalid service content provided by the current service interface is recorded, so as to make it convenient to eliminate the invalid service content when a preset service is provided for a user at 310 (relevant details may refer to the description for operations at 310). Still by using the aforementioned smart TV system as an example, if the current service interface is a video play interface, the invalid service content may be the title of a movie of which the play time is less than 10 minutes.

It should be noted that, for example, in a specific application, if it is determined in this operation that the current service interface, as a leaf node, provides the valid service, a trigger parameter value of the leaf node may be as the preset initial value. For instance, the trigger parameter value is cleared to 0 (reference may be made to operations at 304 for the description about the trigger parameter value), and a preset strategy may be used to set all trigger parameter values of respective nodes corresponding to respective interfaces associated with a service type of the current service interface as preset initial values. Still by using the aforementioned smart TV system as an example, if the user obtains a valid service from the current video play interface, as the video play interface belongs to the category of "film and video", trigger parameter values of respective nodes corresponding to respective interfaces associated with "film and video", that is, respective intermediate nodes and leaf nodes belonging to the branch of "film and video", are set as preset initial values. When it is detected once again that a certain service interface provides an invalid service, setting and level-by-level accumulation of trigger parameter values are performed continuously through operations at 304 and subsequent operations.

At 304, a trigger parameter value of the leaf node is set, and a parent node of the leaf node is used as a current node.

As the technical solution of this example embodiment accumulates the invalid service provided by the user service system (the invalid operation executed by the user) level by level and determines according to an accumulation result whether a preset service is provided for a user, the technical solution of the present disclosure quantifies the invalid service provided by the user service system.

For example, each node in the user service system has a trigger parameter which represents a situation that the node (including respective child nodes of the node) provides an invalid service, and an initial value thereof may be set to 0. When it is detected at 302 that a certain service interface provides an invalid service, a corresponding trigger parameter value is set for a corresponding leaf node, and it is common to set the trigger parameter value according to the number of times the corresponding node does not provide a valid service. For example, if the number of times that the valid service is not provided is 3, the trigger parameter value is correspondingly set to 3.

In another implementation mode, if an implementation mode that a leaf node actively reports and a high-level node is responsible for incremental accumulation is used, the trigger parameter value of the leaf node that provides the invalid service may be set to 1, and at the high-level node thereof, incremental accumulation is performed on the basis of a historical record. In addition, in consideration that the user service system may provide many kinds of services for the user, each service interface and each browsing interface have their own characteristics, and bring different user experiences to the user. Thus, weight coefficients for respective leaf nodes and intermediate nodes are set correspondingly to indicate contribution weights of these nodes for the trigger parameter value of the parent node, and under this situation the trigger parameter value set in the above manner may be multiplied by the weight coefficient of the leaf node to serve as the trigger parameter value of the leaf node.

The above describes multiple methods for setting the trigger parameter value of the leaf node according to the number of times that the valid service is not provided, all of which may have variations for specific implementation modes and do not depart from the core of the present disclosure, and fall within the protection scope of the present disclosure.

After the trigger parameter value of the leaf node is set in this operation, the trigger parameter values are accumulated from the bottom up level by level in subsequent operations, which is a cycle computing process, and herein, a parent node of the leaf node may be firstly set as a current node.

At 306, a trigger parameter value of the current node is calculated according to trigger parameter values of respective child nodes of the current node.

In the current operation and previous operations, it is likely that multiple service interfaces provide an invalid service; in this operation, a trigger parameter value of the current node is calculated according to trigger parameter values of respective child nodes.

For example, as the trigger parameter value represents the situation that the user service system provides an invalid service; generally, the greater the value is, the more the number of times of the invalid service provided by the system is. Based on the above consideration, calculation is made in a manner of accumulative summation in this example embodiment. In the implementation mode of actively reporting level by level, the current node records a trigger parameter value reported thereto by each child node and carries out accumulative summation each time the report is received.

In the event that a weight coefficient is set for the current node, a result of the accumulative summation is multiplied by the weight coefficient and the product is used as the trigger parameter value of the current node, that is:

$$Np = W * \sum_{i=1}^{m} N_i,$$

wherein the current node has a total of m child nodes, Ni is the trigger parameter value of the $i^{th}$ child node, $N_p$ is the trigger parameter value of the current node, and W is a weight coefficient set for the current node in advance.

The above gives a specific example of calculating the trigger parameter value of the current node; in other implementation modes, it is feasible to use other calculation manners different from that in the above example, all of which fall within the protection scope of the present disclosure as long as the trigger parameter value obtained through calculation reflects the situation that the current node and the child nodes thereof provide the invalid service.

At 308, whether the trigger parameter value of the current node is greater than a preset first threshold is determined; if a result is positive, operations at 310 are performed; otherwise, operations at 312 are performed.

Still by using the smart TV system as an example, through analysis from the perspective of psychology, when a user uses a TV set, if his mood tends to be boredom, the purpose is not clear enough when the user operates the TV set, the user will constantly switch among various interfaces and the time during which the user pauses and watches on each interface is shorter. Under such situation, the user will choose to give up using the TV set when finally not finding the content of interest.

In this operation, whether the user is currently in the above state is determined; if the trigger parameter value of the current node is greater than a first threshold set for the current node, it generally indicates that the user has executed invalid operations for multiple times in respective service interfaces included in the current node, and in this case, operations at 310 are performed to provide a service which is preset and often more attractive for the user.

The preset first threshold may be preset for each intermediate node and the root node, may be a fixed value, and may also be a value adjusted and determined according to use experience of the user. Different user service systems may set the threshold on their own, which is not limited in this example embodiment.

If the trigger parameter value of the current node is not greater than the preset first threshold, operations at 312 are performed to prepare for continuously calculating a trigger parameter value of an upper-level node.

At 310, a preset service is provided for a user.

When the trigger parameter value of the current node is greater than the preset first threshold, it indicates that the access of the user to the user service system is in a state with no clear or determined target, and it is likely that the user may give up using the system at any time. At this point, a preset service for the user is actively provided.

The preset service may be a service that attracts the user effectively and makes the user resonate emotionally. Different settings may be made for different user service systems, and still by using a smart TV as an example, to provide a preset service may be recommending preset service content to the user. By use of such a recommendation manner, as selecting a relatively suitable recommendation moment generally raises the user's interest, user loyalty of the TV set is increased and user experience is enhanced.

For example, the techniques of the present disclosure provide services of which the service type is the same as that of the valid service according to the service interface that does not provide the valid service this time. For instance, if it is a video play interface that produces the invalid service, a current popular film may be recommended to the user; if it is a shopping interface that produces the invalid service, one or more goods ranking top in terms of sales volume may be recommended to the user. Thus, a situation that the user browses film and video and a shopping page is recommended will not occur, so that continuity of user browsing experience is maintained.

For example, if invalid service content provided by the service interface has been recorded in the event that it is determined at 302 that the valid service is not provided, at this operation, at the current node, the invalid service content provided by the service interface is eliminated when providing the preset service; further, if the current node includes multiple leaf nodes, invalid service content recorded by respective leaf nodes therebelow are summed, the service content is eliminated when the preset service is provided, and the service content, on which the eliminating operation has been performed, is provided for the user.

In an example implementation, after this operation is performed to provide the preset service for the user, operations may return to 302 once again to begin execution and carry out level-by-level statistics of trigger parameter values according to operation information of the user.

At 312, whether the current node is a root node is determined; and if a result is negative, a parent node of the current node is used as a next current node, and operations turn to 306.

Execution to this operation indicates that the trigger parameter value of the current node is not over the first threshold. At this point, it is determined whether the current node is a root node, and if a result is negative, a parent node of the current node is used as a next current node, operations turn to 306 to continuously calculate the trigger parameter value. If the current node is a root node, it indicates that the user service system does not need to provide the preset service for the user at present, and, according to operations subsequently performed by the user, the above operations are continuously repeated, level-by-level statistics of trigger parameter values are carried out, and the preset service is provided when required.

Figure 4:
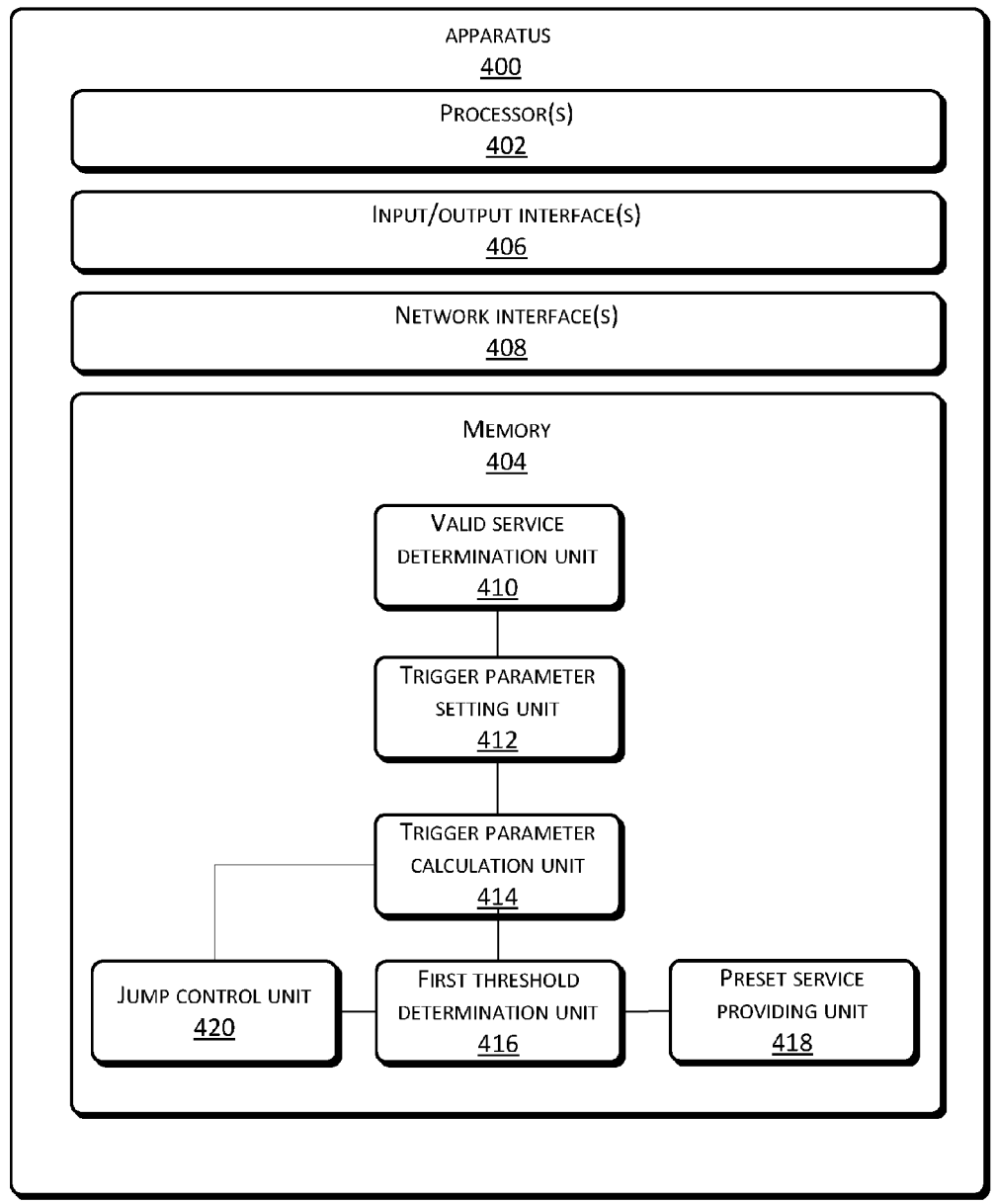
FIG. 4 is a schematic diagram of an example embodiment of a service providing apparatus based on user operation behavior according to the present disclosure.

In the above first example embodiment, a service providing method based on user operation behavior is provided, and correspondingly, the present disclosure further provides a service providing apparatus based on user operation behavior. Referring to FIG. 4, which is a schematic diagram of an example embodiment of an apparatus. As the apparatus example embodiment is basically similar to the method example embodiment, the description thereof is relatively simple, and reference may be made to some descriptions in the method example embodiment for the related content. The apparatus example embodiment described below is only illustrative.

Corresponding to the above method, a service providing apparatus 400 based on user operation behavior according to this example embodiment includes one or more processor(s)

402 or data processing unit(s) and memory 404. The apparatus 400 may further include one or more input/output interface(s) 406, and network interface(s) 408. The memory 404 is an example of computer-readable media.

The memory 404 may store therein a plurality of modules or units including:

a valid service determination unit 410 that determines whether a current service interface, as a leaf node, provides a valid service according to received operation information;

a trigger parameter setting unit 412 that, when output of the valid service determination unit is negative, sets a trigger parameter value of the leaf node, and uses a parent node of the leaf node as a current node;

a trigger parameter calculation unit 414 that calculates a trigger parameter value of the current node according to trigger parameter values of respective child nodes of the current node;

a first threshold determination unit 416 that determines whether the trigger parameter value of the current node is greater than a preset first threshold;

a preset service providing unit 418 that, when output of the first threshold determination unit 416 is positive, providing a preset service for a user; and a jump control unit 420 that, when the output of the first threshold determination sub-unit is negative and when the current node is not a root node, uses a parent node of the current node as a current node, and triggers the trigger parameter calculation unit 414 to work.

Optionally, the trigger parameter calculation unit 414 may include the following sub-units (not shown in FIG. 4):

a child node accumulation sub-unit that sums the trigger parameter values of the respective child nodes; and a weight coefficient multiplication sub-unit that multiplies a result of the above sum by a weight coefficient set for the current node, and uses the product as the trigger parameter value of the current node.

Optionally, the apparatus 400 may further include the following units (not shown in FIG. 4):

a trigger parameter value clearing unit that, when the output of the valid service determination unit is positive, sets trigger parameter values of respective nodes corresponding to respective interfaces associated with a service type of the current service interface as preset initial values.

Optionally, the valid service determination unit 410 determines whether the service interface provides the valid service in the following manner:

whether the time when the service interface provides the service is greater than a preset valid threshold; and/or whether the service interface receives or performs a preset operation.

Optionally, the preset service providing unit 418 recommends preset service content to the user.

Optionally, the preset service providing unit 418, according to a service type of the current service interface, recommends service content that is preset and corresponds to the service type to the user.

Optionally, the apparatus 400 may further include the following units (not shown in FIG. 4):

an invalid service recording unit that, when the output of the valid service determination unit is negative, records invalid service content provided by the current service interface; and the preset service providing unit includes:

an invalid content elimination sub-unit that eliminates the invalid service content provided by the current service interface from the preset service content; and a service content recommendation sub-unit that recommends the service content, from which the eliminating operation has been performed, to the user.

Optionally, the apparatus 400 may be deployed in a smart TV system; and the service interface used by the valid service determination unit includes: a video play interface, a game interface, and/or a shopping ordering interface.

So far, the above descriptions provide a first example embodiment of a service providing method based on user operation behavior and a corresponding apparatus thereof, and on this basis, the present disclosure further provides a second example embodiment of the method.

In the above first example embodiment, in the event that the current service interface provides an invalid service, the trigger parameter value will be calculated from the bottom up level by level each time, and each level provides a preset service for a user when the trigger parameter value is greater than a preset first threshold. Such an implementation mode is relatively flexible, but calculation from the bottom up each time may affect the efficiency. Based on the above consideration, the present disclosure further provides a second example embodiment of the service providing method based on user operation behavior.

In this example embodiment, a second threshold is set for each intermediate node, and only when the trigger parameter value of the node is over the second threshold, the trigger parameter value of a parent node thereof is calculated continuously, which reduces unnecessary calculation amount. In addition, for example, a first threshold of the root node is set to an integer less than the minimum possible value of the trigger parameter, and a first threshold of other non-leaf nodes is set to an integer greater than the maximum possible value of the trigger parameter. By use of such a setting manner, the trigger parameter value of the root node is definitely greater than the first threshold set for the root node, and the trigger parameter value of the intermediate node is definitely less than the first threshold set for the intermediate node, so that only the root node triggers the preset service. The following further describes a processing flow of this example embodiment, wherein the portions that are the same as those in the first example embodiment are not repeated any more, and the description focuses on their differences.

Figure 5:
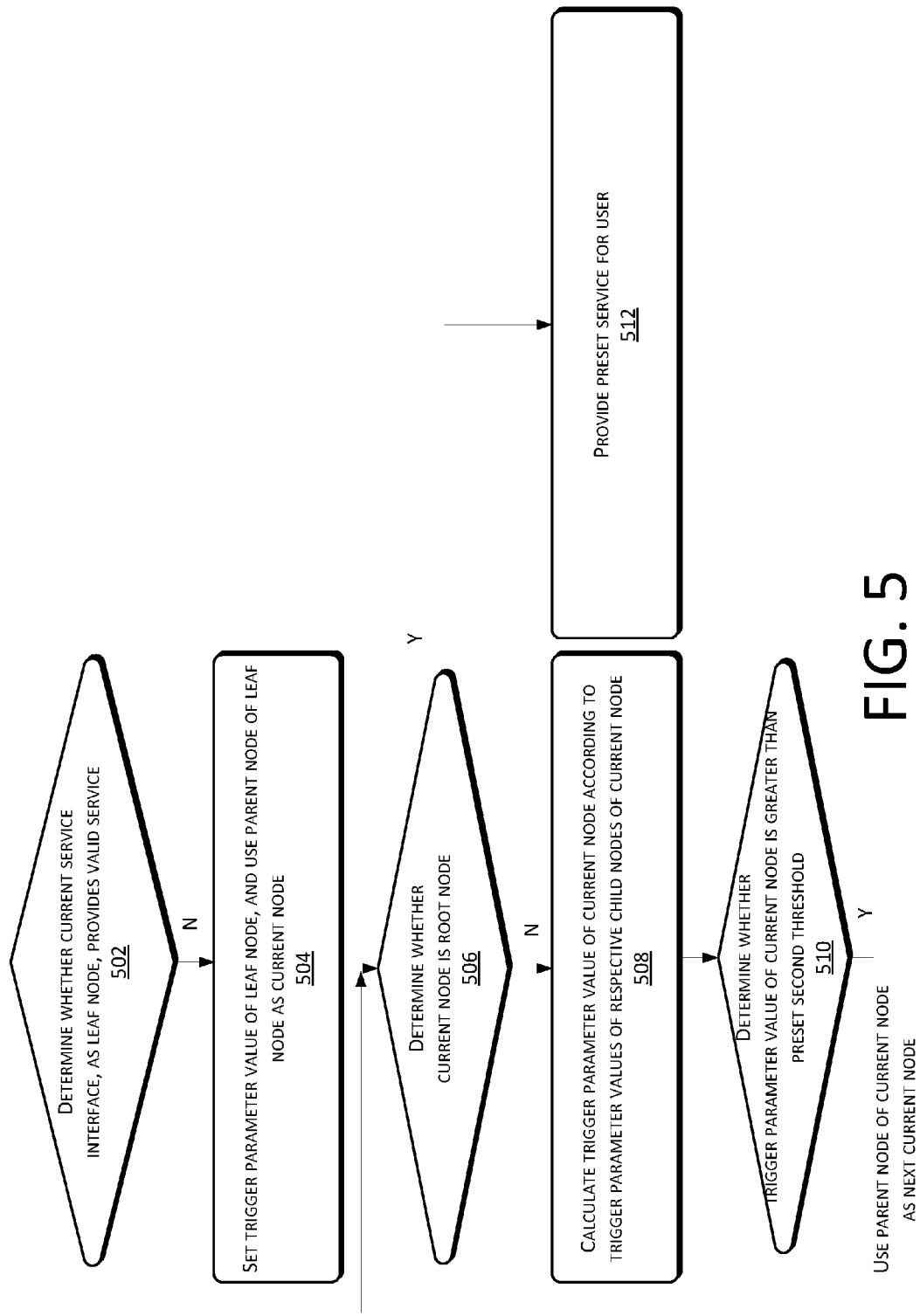
FIG. 5 is a flowchart of a second example embodiment of a service providing method based on user operation behavior according to the present disclosure.

Referring to FIG. 5, which is a flowchart of a second example embodiment of a service providing method based on user operation behavior according to the present disclosure. On the basis of introducing the second threshold and setting the first threshold in the above manner, the method includes steps as follows:

At 502, whether a current service interface, as a leaf node, provides a valid service is determined according to received operation information, and if a result is negative, operations at 504 are performed.

The processing manner of the operation at 502 is basically the same as the operation at 302 in the first example embodiment. Relevant details may refer to the related description at 302.

At 504, a trigger parameter value of the leaf node is set, and a parent node of the leaf node is used as a current node.

The processing manner of the operation at 504 is basically the same as the operation at 304 in the first example embodiment. Relevant details may refer to the related description at 304.

After the processing of this operation is completed, the subsequent operation is a process of, under the control of the second threshold, calculating the trigger parameter values from the bottom up level by level.

At 506, whether the current node is a root node is determined; and if a result is positive, operations at 512 are performed; otherwise, operations at 508 are performed.

In this example embodiment, except the root node, it is unlikely that other nodes make a decision of providing a preset service for a user, and once an accumulative calculation process of the trigger parameter value triggers the root node, no matter what trigger parameter values of child nodes are set, it will be considered that it's time to provide the preset service for the user, and the service is provided; therefore, it is not necessary to calculate a trigger parameter value for the root node, the process directly turns to operations at 512. If the current node is not a root node, operations at 508 are performed to calculate a trigger parameter value of the current node.

At 508, a trigger parameter value of the current node is calculated according to trigger parameter values of respective child nodes of the current node.

The processing manner of the operation at 508 is basically the same as the operation at 306 in the first example embodiment. Relevant details may refer to the related description at 306.

At 510, whether the trigger parameter value of the current node is greater than a preset second threshold is determined; and if a result is positive, the parent node of the current node is used as a next current node, and the process turns to 506.

The reason for setting a second threshold for the intermediate node is to reduce the amount of calculation and improve processing efficiency. When invalid services provided by respective leaf nodes included in a certain intermediate node do not reach a certain degree, the calculation of an upper-level parent node is not triggered, thereby limiting the amount of calculation within a limited range. Only when invalid operations executed by the user are accumulated to a certain number, the calculation of an upper-level node is triggered, and through the same accumulation process, the upper-level node is finally triggered level by level to the root node.

Based on the above reasons, in this operation, whether a trigger parameter value that represents a degree of invalid operation accumulation is greater than a preset second threshold is determined, and if a result is positive, the calculation of an upper-level parent node is triggered, that is, a parent node of the current node is used as a next current node, and the process turns to 506; otherwise, execution of the method is ended.

At 512, a preset service is provided for a user.

Execution to this operation indicates that the root node has been triggered. In the processing manner provided by this example embodiment, it indicates that it's time to provide a preset service for a user, and at this point, accumulative calculation is not performed according to the trigger parameter values of the respective child nodes any more, and the service is provided directly.

Likewise, similar to the first example embodiment, when the preset service is provided, invalid service content that has been previously recorded are eliminated, thereby providing the user with a service that may interest the user.

So far, two example embodiments of a service providing method according to the present disclosure have been described. In an implementation, it is feasible to select a corresponding implementation mode according to actual demands.

Since respective interfaces (that is, respective nodes) of the user service system to which the technical solution is applied have a certain logic relationship therebetween, during specific implementation of the technical solution, a behavior tree may be used to determine a valid or invalid service and accumulate trigger parameter values level by level.

The behavior tree is a tree-like data structure, and has stronger logical expression ability than a finite state machine, and express complicated logic very easily. Nodes of the behavior tree have different types and functions, and may be divided into two types, behavior nodes and control nodes. Leaf nodes of the behavior tree are all behavior nodes, and actual execution operations are all performed in the behavior nodes. The nodes other than the leaf nodes are control nodes, the control nodes may also be divided into: selection nodes and sequence nodes. In terms of the selection nodes, if one child node is successfully executed, a result of success is returned, which is equivalent to logic "OR". In terms of the sequence nodes, if one child node is unsuccessfully executed, a result of failure is returned, and if all child nodes are successfully executed, a result of success is returned, which is equivalent to logic "AND".

Figure 6:
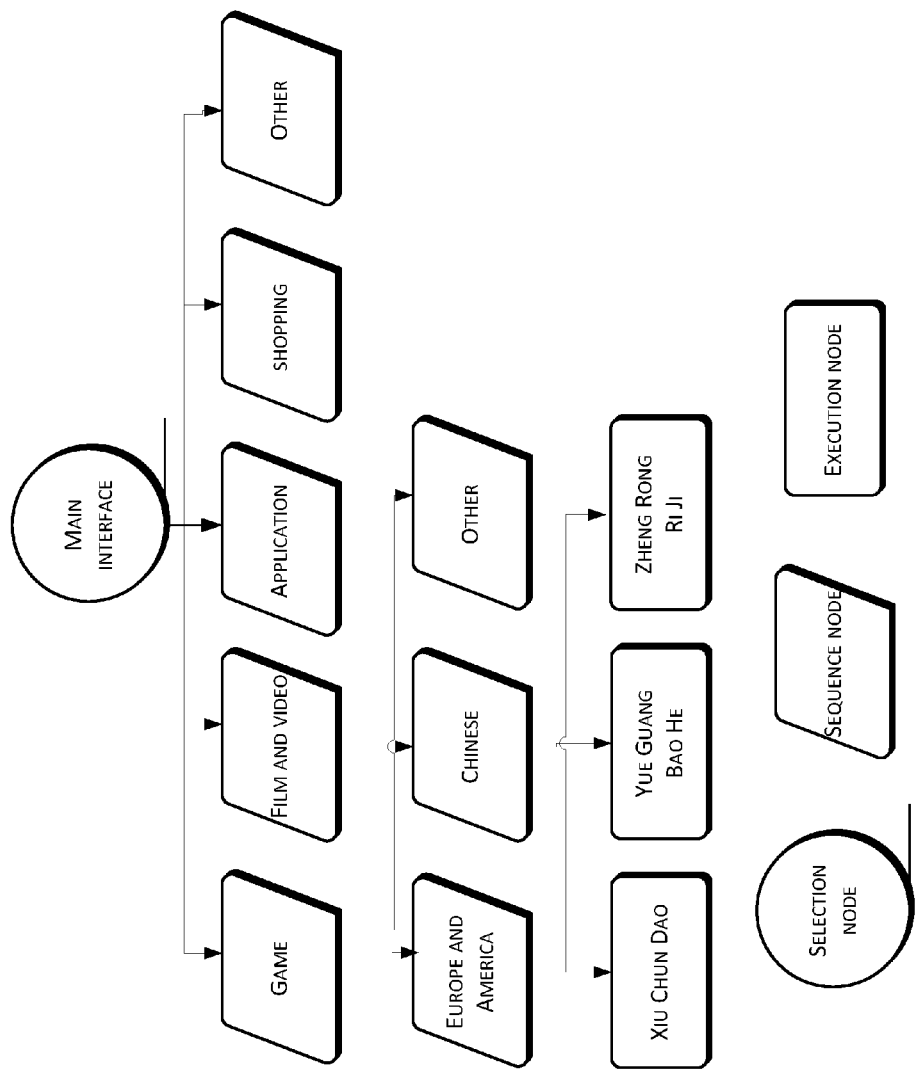
FIG. 6 is a schematic diagram of a smart TV system that is described by using a behavior tree according to the present disclosure.

With respect to the technical solution, by using that the second example embodiment is applied to a smart TV system as an example, a leaf node corresponds to an execution node in the behavior tree that executes a determination action of a valid operation or invalid operation. In terms of the intermediate node, when the trigger parameter value of the child node is not 0, accumulation is performed and next child node is continuously accepted, and the node is cleared zeroed as long as the trigger parameter value of one child node is set to an initial value of 0. That is, the intermediate node accumulates invalid operations of all the child nodes, and thus corresponds to the sequence node in the behavior tree. In terms of the root node, the preset service is provided for the user as long as one child node is triggered. That is, the root node does not accumulate trigger parameter values of child nodes thereof, and thus corresponds to the selection node in the behavior tree. Referring to FIG. 6, which is a schematic diagram of the smart TV system that is described by using a behavior tree (in terms of the first example embodiment, since the root node also accumulates trigger parameter values of child nodes thereof and the preset service is provided only when the trigger parameter values are greater than the first threshold. Thus, in such an implementation mode, the root node may also correspond to the sequence node in the behavior tree).

In addition, the behavior tree may be used to generate a configuration file by using a tool, and the user service system that implements the technical solution may change logic flexibly according to the configuration file, to achieve data driving. For example, a behavior tree is constructed at first according to design logic of the user service system, and a description file may be generated by using a tool and may be a simple XML format, which is as follows, for example:

```
<root name="desktop" index=0>
  <node name="film and video" index=1 weight=0.5 threshold=5>
    <node name="Chinese" index=4 weight=0.5 threshold=5>
      <node name="Iron Man" index=6>
      </node>
      <node name="Avatar" index=7>
      </node>
      <node name="Transformers" index=8>
      </node>
    </node>
    <node name="Europe and America" index=5 weight=0.4 threshold=6>
```

```
    </node>
  </node>
  <node name="game" index=2 weight=0.7 threshold=4>
  </node>
  <node name="shopping" index=3 weight=0.4 threshold=6>
  </node>
</root>
```

For example, the techniques of the present disclosure may represent the behavior tree by using the parents linked list representation, and store nodes of the behavior tree by using an array. The benefit of using an array is fast searching. Leaf nodes are directly found according to indexes, and then a parent node thereof is directly found. In the above XML file, the index is an index when the behavior tree is stored by using an array, which is globally unique; weight is the weight coefficient of the current node; and threshold is the second threshold of the current node.

Each service interface may correspond to one process respectively, and a background process S uniformly processes logic conversion of the behavior tree. The process of the service interface and the background process S conduct communication through an inter-process communication mechanism provided by the system. Respective service interface processes parse the XML description file, find their nodes in the behavior tree according to their names, read index and other values, and store them. The process S also reads the XML description file, constructs a complete behavior tree for all the nodes and maintains operation of the behavior tree. When the process of the service interface produces a valid operation or invalid operation, the process S is notified through the inter-process communication mechanism, index of the service interface is transferred, and the parameter value is triggered. The process S, after receiving the notification, runs a node whose index is index in the behavior tree, updates the state thereof, and determines whether to trigger a parent node.

The above describes an implementation mode of implementing the technical solution in a system consisting of multiple processes. In addition, the technical solution of the present disclosure may also be implemented in a user service system with a single process; at this point, the behavior tree need not be maintained by using the process S, and the function of maintaining the behavior tree is turned to a module, which is called when a valid operation or invalid operation is produced on a certain service interface.

It should be noted that the use of the behavior tree is an example implementation of the technical solution of the present disclosure. In some specific implementations, another data structure rather than the behavior tree may be used. For example, an ordinary tree-like structure is used to record and make statistics of valid operations and invalid operations provided by service interfaces, and different strategies (accumulation/non-accumulation) are selected to process nodes at different depths.

In addition, in some user service systems where interface hierarchical structures that are designed to be more complicated, the user's operation logic on the interface is more complicated than the tree-like structure, which may form a graph structure, such as a directed acyclic graph. In this case, in the user's different operating paths, the same node will have multiple parent nodes; however, as long as in an operating path starting from the root node each time, the parent node of each node is still unique, the trigger parameter value of the parent node is calculated level by level under the current operating path.

For example, the method according to the present disclosure may be not only completed by a client terminal on its own, but also completed by a service terminal and a client terminal that presents a service interface for the user through cooperation. For instance, the user's operation information is collected by the client terminal (such that the user enters into which service interface at which time point, the user exits out of which service interface at which time point, and so on). The client terminal sends the information to the service terminal. The service terminal determines whether a valid service is provided, sequentially calculates trigger parameter values of respective parent nodes, and compares the trigger parameter values with a threshold for determination. The service terminal pushes the preset service to the client terminal and the client terminal provides the preset service for the user.

The above gives multiple alteration modes of implementing the technical solution, and no matter which implementation mode is adopted, the implementation mode does not depart from the core of the present disclosure as follows. Whether a current service interface provides a valid service is determined according to received operation information; and when the valid service is not provided and a preset service trigger condition is met, a preset service is provided for a user. By use of the above method, the techniques of the present disclosure relatively accurately identify whether the user is in a browsing state with an undetermined target, and timely provide a preset service for the user, thereby increasing user loyalty of a user service system and improving use experience of the user. In particular, the method is applied to a smart TV system, which effectively enhances the recommendation conversion rate as a relatively accurate recommendation moment is selected according to the user state.

Figure 7:
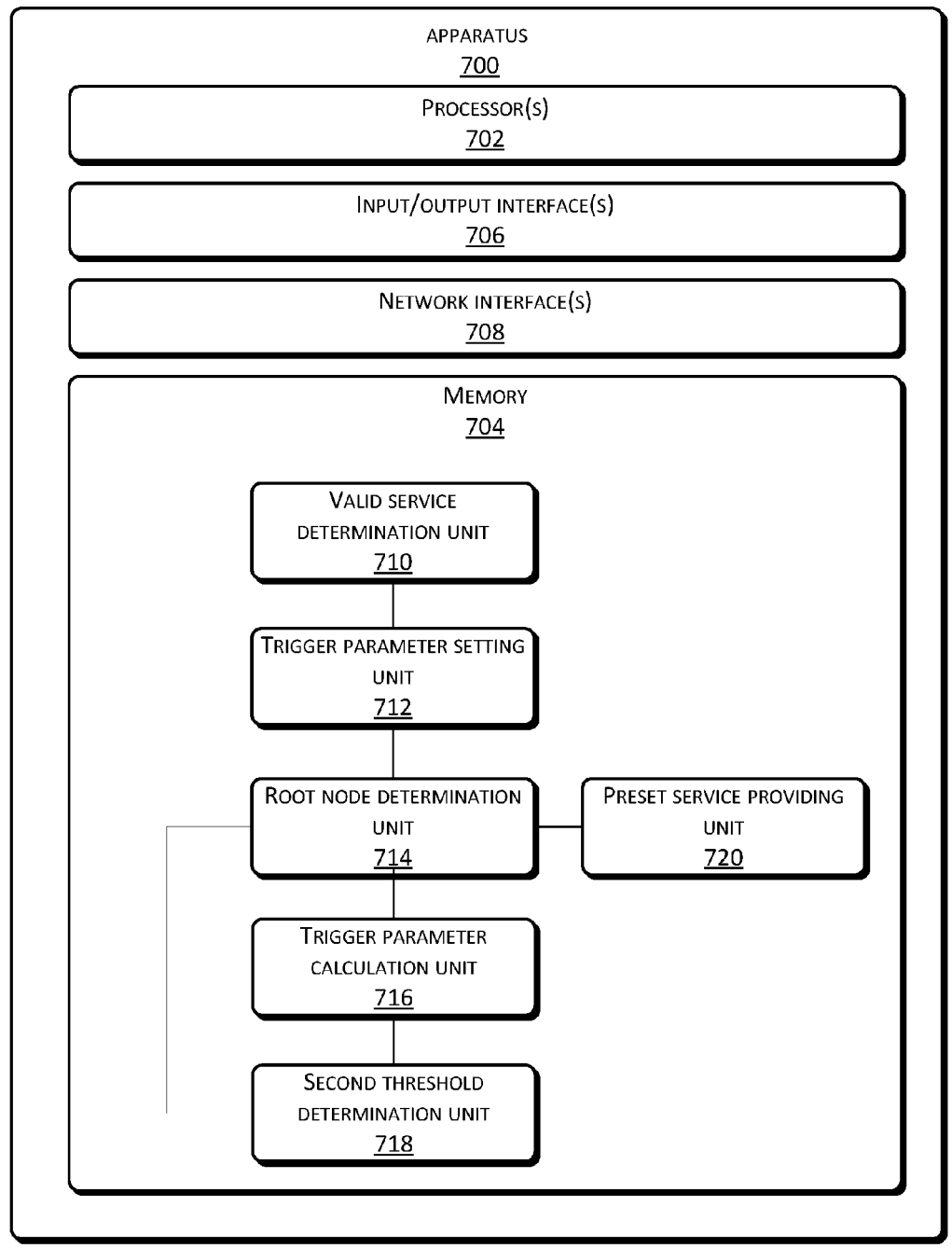
FIG. 7 is a schematic diagram of another example embodiment of a service providing apparatus based on user operation behavior according to the present disclosure.

Corresponding to the second example embodiment of a service providing method based on user operation behavior, the present disclosure further provides a service providing apparatus based on user operation behavior. Referring to FIG. 7, which is a schematic diagram of an example embodiment of the apparatus. As the apparatus example embodiment is basically similar to the method example embodiment, the description thereof is relatively simple, and reference may be made to some descriptions in the method example embodiment for the related content. The apparatus example embodiment described below is merely schematic.

A service providing apparatus 700 of this example embodiment includes one or more processor(s) 702 or data processing unit(s) and memory 704. The apparatus 700 may further include one or more input/output interface(s) 706, and network interface(s) 708. The memory 704 is an example of computer-readable media.

The memory 704 may store therein a plurality of modules or units including:

a valid service determination unit 710 that determines whether a current service interface, as a leaf node, provides a valid service according to received operation information;

a trigger parameter setting unit 712 that, when output of the valid service determination unit is negative, sets a trigger parameter value of the leaf node, and uses a parent node of the leaf node as a current node;

a root node determination unit 714 that determines whether the current node is a root node;

a trigger parameter calculation unit 716 that, when output of the root node determination unit is negative, calculates a trigger parameter value of the current node according to trigger parameter values of respective child nodes of the current node;

a second threshold determination unit 718 that determines whether the trigger parameter value of the current node is greater than a preset second threshold, and if a result is positive, uses a parent node of the current node as a current node and triggers the root node determination unit to work; and reset service providing unit 720 that, when the output of the root node determination unit 714 is positive, provides a preset service for a user.

Optionally, the trigger parameter calculation unit 716 may include the following sub-units (not shown in FIG. 7):

a child node accumulation sub-unit that sums the trigger parameter values of the respective child nodes; and a weight coefficient multiplication sub-unit that multiplies a result of the sum by a weight coefficient set for the current node, and uses the product as the trigger parameter value of the current node.

Optionally, the apparatus 700 may further include the following units (not shown in FIG. 7):

a trigger parameter value clearing unit that, when the output of the valid service determination unit is positive, sets trigger parameter values of respective nodes corresponding to respective interfaces associated with a service type of the current service interface as preset initial values.

Optionally, the valid service determination unit 710 determines whether the service interface provides the valid service in the following manner:

whether the time when the service interface provides the service is greater than a preset valid threshold; and/or whether the service interface receives or performs a preset operation.

Optionally, the preset service providing unit is specifically that recommending preset service content to the user.

Optionally, the preset service providing unit 720, according to a service type of the current service interface, recommends service content that is preset and corresponds to the service type to the user.

Optionally, the apparatus 700 further includes the following unit (not shown in FIG. 7):

an invalid service recording unit that, when the output of the valid service determination unit is negative, records invalid service content provided by the current service interface; and the preset service providing unit 720 includes the following sub-units (not shown in FIG. 7):

an invalid content elimination sub-unit that eliminates the invalid service content provided by the current service interface from the preset service content; and a service content recommendation sub-unit that recommends the service content, from which the eliminating operation has been performed, to the user.

Optionally, the apparatus is implemented in a manner as follows: using a behavior tree to record related information about the service interface providing a service for the user, and managing respective nodes and a relationship between the respective nodes. A leaf node corresponds to an execution node in the behavior tree, an intermediate node corresponds to a sequence node in the behavior tree, and a root node corresponds to a selection node or a sequence node in the behavior tree.

Optionally, the apparatus is deployed at a service terminal and a client terminal that presents a service interface for the user.

The client terminal receives operation information of the user. The valid service determination unit and the preset service providing unit are deployed at the service terminal. The client terminal further provides the preset service pushed by the preset service providing unit at the service terminal for the user.

Optionally, the apparatus is deployed in a smart TV system; and the service interface used by the valid service determination unit includes: a video play interface, a game interface, and/or a shopping ordering interface.

Although the present disclosure has been disclosed as above with example embodiments, the example embodiments are not used to limit the present disclosure. Any person skilled in the art may make possible variations and modifications without departing from the spirit and scope of the present invention, and thus the protection scope of the present disclosure should be subject to the scope defined by the claims of the present disclosure.

In a typical configuration, a computing device, such as the client terminal or the service terminal, includes one or more central processing units (CPUs), an input/output interface, a network interface and a memory.

The memory may include the following forms of a computer readable medium: a volatile memory, a random access memory (RAM) and/or a non-volatile memory, for example, a read-only memory (ROM) or flash RAM. The memory is an example of the computer readable medium.

The computer-readable media includes volatile and non-volatile, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

As will be appreciated by persons skilled in the art, the example embodiments of the present disclosure may be embodied as a method, a system or a computer program product. Accordingly, the present disclosure may take the form of an entire hardware example embodiment, an entire software example embodiment or an example embodiment combining software and hardware aspects. Furthermore, the present disclosure may take the form of a computer program product implemented on one or more computer-readable media (including, but is not limited to, magnetic disk memories, CD-ROMs, optical memories, etc.) including computer-executable instructions.

What is claimed is:

1. A method implemented by a smart TV system having one or more processors, the method comprising:

providing a current service interface to a user in the smart TV system;

determining whether the current service interface provides a valid service according to received user operation information based upon a time interval, the time interval measured between time points when the user enters and exits the current service interface; and upon determining that the current service interface does not provide the valid service based upon the time interval being less than a preset valid threshold:
    determining that a preset service trigger condition is met,
    reducing an amount of calculation, by the one or more processors of the smart TV system, for a trigger parameter value of an upper-level interface of the current service interface by calculating the trigger parameter value of the upper-level interface only upon determining that the preset service trigger condition is met, and
    providing a preset service for the user as a browsing interface; or
determining that the current service interface provides the valid service based upon the time interval being not less than the preset valid threshold.

2. The method of claim 1, wherein the preset service trigger condition includes that a number of times that the valid service is not provided is greater than a preset threshold.

3. The method of claim 2, wherein the number of times that the valid service is not provided includes:
    a number of times that the current service interface does not provide the valid service.

4. The method of claim 2, wherein the number of times that the valid service is not provided includes:
    a number of times that the current service interface does not provide the valid service; and
    a number of times that one or more lower-level interfaces of the current service interface's upper-level interface do not provide the valid service.

5. The method of claim 4, further comprising:
    using the current service interface as a leaf node; and
    the determining that the preset service trigger condition is met includes:
    setting a trigger parameter value of the leaf node;
    using a parent node of the leaf node as a current node; and
    calculating a trigger parameter value of the current node according to trigger parameter values of respective one or more child nodes of the current node; and
    determining that the preset service trigger condition is met in response to determining that the trigger parameter value of the current node is greater than a preset first threshold, wherein:
    the trigger parameter value is set according to a number of times that a corresponding node does not provide the valid service;
    the parent node of the leaf node corresponds to the upper-level interface of the service interface; and
    the respective one or more child nodes of the current node correspond to one or more lower-level interfaces of the upper-level interface respectively.

6. The method of claim 5, wherein the calculating the trigger parameter value of the current node according to trigger parameter values of respective one or more child nodes of the current node includes:
    summing the trigger parameter values of the respective one or more child nodes;
    multiplying a result of the summing by a weight coefficient set for the current node; and
    using a product of the multiplying as the trigger parameter value of the current node.

7. The method of claim 5, further comprising:
    using the parent node of the current node as a next current node in response to determining that the trigger parameter value of the current node is not greater than the preset first threshold.

8. The method of claim 5, further comprising:
    setting a first threshold preset for a root node as an integer less than a minimum value of a corresponding trigger parameter;
    setting a first threshold preset for a non-leaf node as an integer greater than a maximum value of a corresponding trigger parameter;
    determining that the trigger parameter value of the current node is not greater than the preset first threshold;
    determining that the trigger parameter value of the current node is greater than a preset second threshold; and
    using the parent node of the current node as a next current node.

9. The method of claim 5, further comprising:
    setting a trigger parameter value of a respective node corresponding to a respective interface associated with a service type of the current service interface as a preset initial value.

10. The method of claim 1, wherein the determining whether the current service interface provides the valid service according to the received user operation information includes:
    determining that the service interface receives or performs a preset operation.

11. The method of claim 1, wherein the providing the preset service for the user includes recommending a preset service content to the user.

12. The method of claim 11, wherein the recommending the preset service content to the user includes:
    recommending a service content that is preset and corresponds to a service type to the user according to the service type of the current service interface.

13. The method of claim 1, further comprising:
    prior to determining that the preset service trigger condition is met, recording an invalid service content provided by the current service interface,
    wherein the providing the preset service for the user includes:
    eliminating the invalid service content provided by the current service interface from a preset service content; and
    recommending a service content from which the invalid service content is eliminated to the user.

14. The method of claim 1, further comprising:
    using a behavior tree to record related information of a service interface providing a service for the user; and
    managing respective nodes and a relationship between the respective nodes,
    wherein:
    a leaf node corresponds to an execution node in the behavior tree;
    an intermediate node corresponds to a sequence node in the behavior tree; and
    a root node corresponds to a selection node or a sequence node in the behavior tree.

15. The method of claim 1, wherein:
    the method is completed by a service terminal and a client terminal of the smart TV system that presents a service interface for the user through cooperation;
    the user operation information is received by the client terminal;

the determining whether the valid service is provided and whether the preset service trigger condition is met are implemented by the service terminal;

the service terminal pushes the preset service to the client terminal; and the client terminal provides the preset service for the user.

16. The method of claim 1, wherein the current service interface includes:

a video play interface;

a game interface; or a shopping ordering interface.

17. An apparatus comprising:

one or more processors; and one or more memories stored thereon computer-executable instructions, executable by the one or more processors, to cause the one or more processors to perform acts comprising:

providing a current service interface to a user;

determining whether the current service interface provides a valid service according to received user operation information based upon a time interval, the time interval measured between time points when the user enters and exits the current service interface; and upon determining that the current service interface does not provide the valid service based upon the time interval being less than a preset valid threshold:

determining that a preset service trigger condition is met, reducing an amount of calculation, by the one or more processors, for a trigger parameter value of an upper-level interface of the current service interface by calculating the trigger parameter value of the upper-level interface only upon determining that the preset service trigger condition is met, and providing a preset service for the user as a browsing interface; or determining that the current service interface provides the valid service based upon the time interval being not less than the preset valid threshold.

18. The apparatus of claim 17, wherein the determining whether the current service interface provides the valid service according to the received user operation information includes:

determining that the service interface receives or performs a preset operation.

19. One or more memories stored thereon computer-executable instructions, executable by one or more processors, to cause the one or more processors to perform acts comprising:

providing a current service interface to a user;

determining whether the current service interface provides a valid service according to received user operation information based upon a time interval, the time interval measured between time points when the user enters and exits the current service interface; and upon determining that the current service interface does not provide the valid service based upon the time interval being less than a preset valid threshold:

determining that a preset service trigger condition is met, reducing an amount of calculation, by the one or more processors, for a trigger parameter value of an upper-level interface of the current service interface by calculating the trigger parameter value of the upper-level interface only upon determining that the preset service trigger condition is met, and providing a preset service for the user as a browsing interface; or determining that the current service interface provides the valid service based upon the time interval being not less than the preset valid threshold.

* * * * *